United States Patent
Comer et al.

(10) Patent No.: US 11,307,749 B1
(45) Date of Patent: Apr. 19, 2022

(54) MANAGING CONTENT OF A USER INTERFACE

(71) Applicant: Dell Products L.P., Round Rock, TX (US)

(72) Inventors: Ryan Nicholas Comer, Pflugerville, TX (US); Tyler Ryan Cox, Austin, TX (US); Marc Randall Hammons, Round Rock, TX (US); Richard William Schuckle, Austin, TX (US); Jake Mitchell Leland, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/147,850

(22) Filed: Jan. 13, 2021

(51) Int. Cl.
*G06F 3/048* (2013.01)
*G06F 3/04845* (2022.01)
*G06F 7/24* (2006.01)
*G06K 9/62* (2022.01)

(52) U.S. Cl.
CPC ............ *G06F 3/04845* (2013.01); *G06F 7/24* (2013.01); *G06K 9/6215* (2013.01); *G06K 9/6232* (2013.01)

(58) Field of Classification Search
CPC ..... G06F 3/04845; G06F 7/24; G06K 9/6215; G06K 9/6232
See application file for complete search history.

(56) References Cited

U.S. PATENT DOCUMENTS

| | | | |
|---|---|---|---|
| 10,747,400 B1* | 8/2020 | Majumder | G06F 16/248 |
| 2016/0350307 A1* | 12/2016 | VerWeyst | H04L 63/101 |
| 2017/0329479 A1* | 11/2017 | Rauschenbach | G06F 3/04817 |
| 2019/0370094 A1* | 12/2019 | Louch | G06F 9/543 |
| 2020/0372292 A1* | 11/2020 | Koval | G06F 16/735 |
| 2021/0342785 A1* | 11/2021 | Mann | G06F 16/26 |
| 2021/0357684 A1* | 11/2021 | Amirghodsi | G06N 20/00 |

* cited by examiner

*Primary Examiner* — David Phantana-angkool
(74) *Attorney, Agent, or Firm* — Baker Botts L.L.P.

(57) ABSTRACT

Managing content of a user interface, including identifying an UI application that provides for display a UI on a display device, the UI application providing a primary content item for inclusion by the UI; identifying a request for a secondary content item to be included within the UI, and in response, identifying one or more secondary content items; performing content feature extraction of the primary content item to identify primary content features; performing content feature extraction of the secondary content items to identify secondary content features; comparing the primary content features and the secondary content features to identify similarities therebetween; sorting the secondary content features based on the similarity between the secondary content features and the primary content features; identifying a particular secondary content item of the one or more secondary content items; updating the UI to include the particular secondary content item within the UI.

20 Claims, 7 Drawing Sheets

MANAGING CONTENT OF A USER INTERFACE

BACKGROUND

Field of the Disclosure

The disclosure relates generally to an information handling system, and in particular, managing content of a user interface of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in method for managing content of a user interface, the method including identifying a user interface (UI) application that provides for display a UI on a display device, the UI application providing a primary content item for inclusion by the UI; identifying a request for a secondary content item to be included within the UI; in response to the request: identifying one or more secondary content items; performing content feature extraction of the primary content item to identify primary content features; performing content feature extraction of the secondary content items to identify secondary content features; comparing the primary content features and the secondary content features to identify similarities between the secondary content features and the primary content features; sorting the secondary content features based on the similarity between the secondary content features and the primary content features; identifying, based on the sorting, a particular secondary content item of the one or more secondary content items; and updating the UI to include the particular secondary content item within the UI.

Other embodiments of these aspects include corresponding systems, apparatus, and computer programs, configured to perform the actions of the methods, encoded on computer storage devices.

These and other embodiments may each optionally include one or more of the following features. For instance, identifying, based on the sorting, the particular secondary content item of two or more secondary content items. Sorting further includes ranking the secondary content features based on the similarity between each secondary content feature and the primary content features, and wherein identifying the particular secondary content item further includes identifying a highest ranked secondary content feature and identifying the particular secondary content item that corresponds to the highest ranked secondary content item. Identifying additional primary content items previously provided for display on the UI of the display device by the UI application; performing content feature extraction of the additional primary content items to identify additional primary content features; identifying previous interactions of a user with the additional primary content items; and applying a machine learning model to identify user preferences of the user based on the previous interactions of the user with the additional primary content items. Comparing the user preferences and the secondary content features to identify similarities between the secondary content features and the user preferences; sorting the secondary content features based on the similarity between the secondary content features and the user preferences; identifying, based on the sorting, an additional particular secondary content item of the two or more secondary content items; and updating the UI to include the additional particular secondary content item within the UI. Modifying the particular secondary content item based on the primary content features. Modifying the particular content item includes adding a color filter to the particular content item based on a main color of the primary content features. The particular secondary content item is a video content item, the method further comprising: sorting frames of the video content item based on a similarity between the secondary content features and the primary content features; identifying, based on the sorting, a particular frame of the particular secondary content item; and updating the UI to include the particular frame of the particular secondary content item within the UI. Performing content feature extraction of the primary content item to identify primary content features further includes performing scale-invariant feature transform of the primary content item to identify primary content features, and wherein performing content feature extraction of the secondary content item to secondary primary content features further includes performing scale-invariant feature transform of the secondary content item to identify secondary content features.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
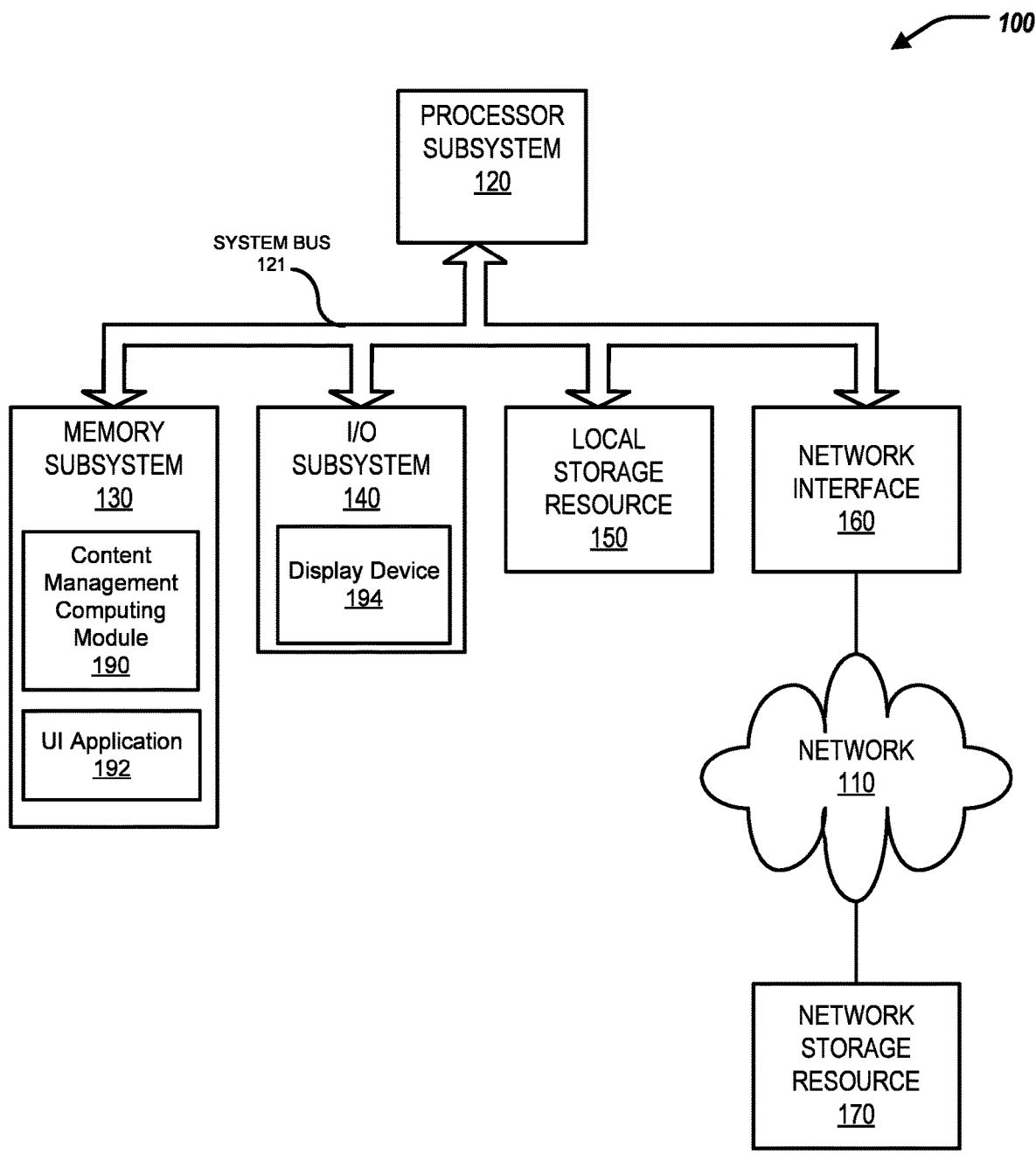
FIG. 1 is a block diagram of selected elements of an embodiment of a computing environment.

This disclosure discusses methods and systems for managing content of a user interface of an information handling system. In short, a user interface (UI) application can be a user-facing application that can provide primary content (e.g., when the UI application is a game, the primary content can be the game) as well as provide for display secondary content (recommended content) that is obtained from a third-party source. For example, the secondary content can include news articles, streams, advertisements, game highlights, etc. that can be related to the primary content. The primary content can have a specific style and theme, and a content management computing module can identify secondary content that can be similar in style and content to the primary content (e.g., to maintain immersion of the user). For example, the user can be playing a game (primary content) that is "dark and gloomy." To maintain immersion for the user, the content management computing module can identify secondary content (from a third party source) that is similar to the style of "dark and gloomy" that can be presented in the UI, described further herein. In some cases, the content management computing module can augment/modify the secondary content to more closely match the primary content, described further herein. In some examples, the content management computing module can utilize machine learning to predict styles the user wants to see, described further herein.

Specifically, this disclosure discusses a system and a method of managing content of a user interface, the method including identifying a user interface (UI) application that provides for display a UI on a display device, the UI application providing a primary content item for inclusion by the UI; identifying a request for a secondary content item to be included within the UI; in response to the request: identifying one or more secondary content items; performing content feature extraction of the primary content item to identify primary content features; performing content feature extraction of the secondary content items to identify secondary content features; comparing the primary content features and the secondary content features to identify similarities between the secondary content features and the primary content features; sorting the secondary content features based on the similarity between the secondary content features and the primary content features; identifying, based on the sorting, a particular secondary content item of the list of secondary content items; and updating the UI to include the particular secondary content item within the UI.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. For example, as illustrated the I/O subsystem 140 includes a display device 194.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The memory subsystem 130 can include a content management computing module 190. The content management computing module 190 can include a computer-executable program (software). The content management computing module 190 can be executed by the processor subsystem 120.

The memory subsystem 130 can further include a user interface (UI) application 192. The UI application 192 can include a computer-executable program (software). The UI application 192 can be executed by the processor subsystem 120.

In short, the UI application 192 can be a user-facing application that can provide primary content (e.g., when the UI application 192 is a game, the primary content can be the game) as well as provide for display secondary content (recommended content) that is obtained from a third-party source. For example, the secondary content can include news articles, streams, advertisements, game highlights, etc. that can be related to the primary content. The primary content can have a specific style and theme, and the content management computing module 190 can identify secondary content that can be similar in style and content to the primary content (e.g., to maintain immersion of the user). For example, the user can be playing a game (primary content) that is "dark and gloomy." To maintain immersion for the user, the content management computing module 190 can identify secondary content (from a third party source) that is similar to the style of "dark and gloomy" that can be presented in the UI, described further herein. In some cases, the content management computing module 190 can augment/modify the secondary content to more closely match the primary content, described further herein. In some examples, the content management computing module 190 can utilize machine learning to predict styles the user wants to see, described further herein.

Figure 2:
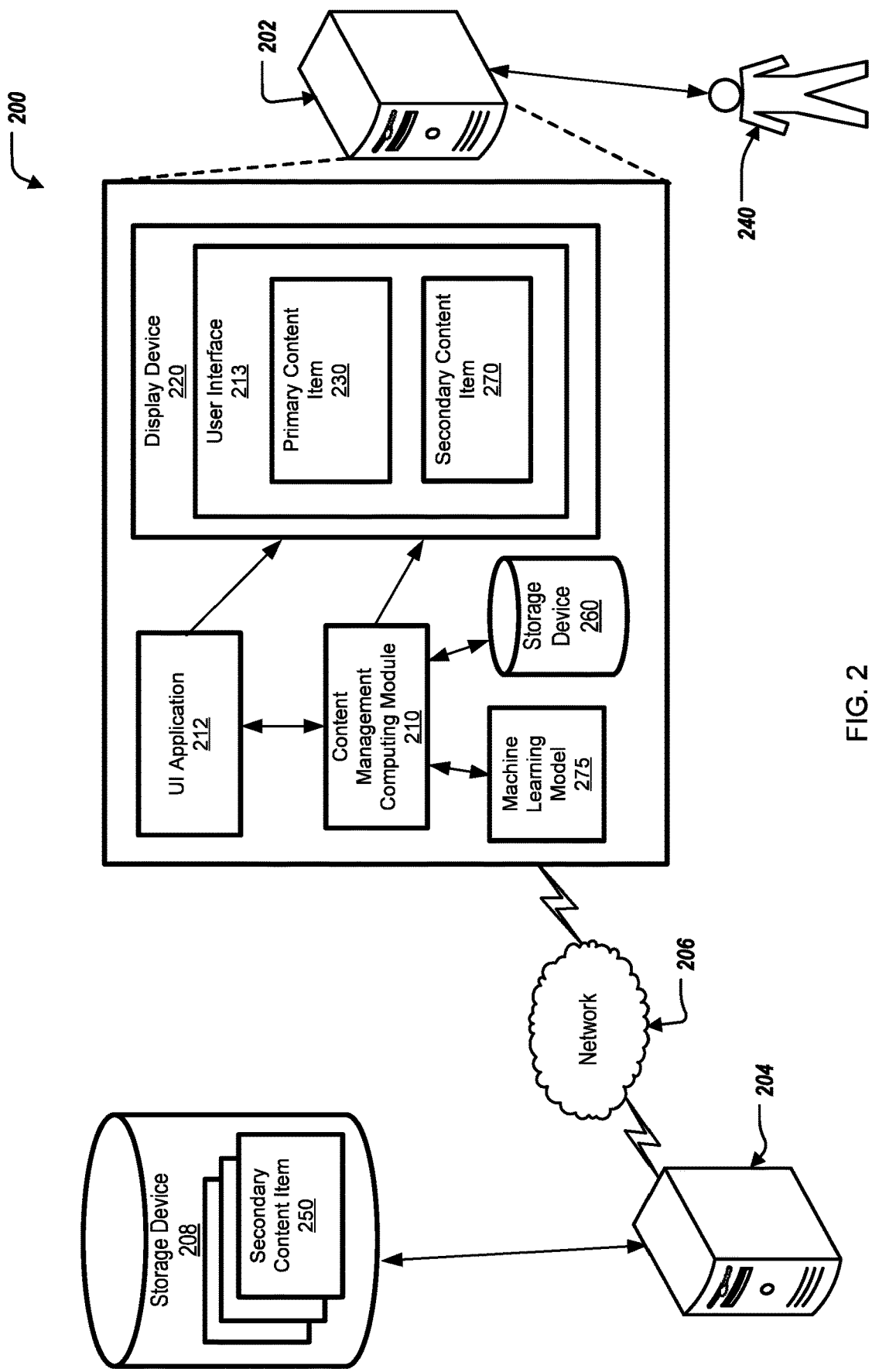
FIG. 2 illustrates a block diagram of a computing environment managing content of a user interface of an information handling system.

Turning to FIG. 2, FIG. 2 illustrates an environment 200 including an information handling system 202, a third party content provider 204, a network 206, and a storage device 208. The information handling system 202 can be in communication with the third party content provider 204 over the network 206. The information handling system 202 can be similar to, or include, the information handling system 100 of FIG. 1.

The information handling system 202 can include a content management computing module 210, a user interface (UI) application 212, and a storage device 260. The content management computing module 210 can be similar to, or include, the content management computing module 190 of FIG. 1. The UI application 212 can be similar to, or include, the UI application 192 of FIG. 1.

The information handling system 202 can further include a display device 220. The display device 220 can be similar to, or include, the display device 194 of FIG. 1. The content management computing module 210 and the UI application 212 are in communication with the display device 220. The content management computing module 210 can be in communication with the UI application 212. The content management computing module 210 can be in communication with the storage device 260.

The third party content provider 204 can be in communication with the storage device 208.

Figure 3:
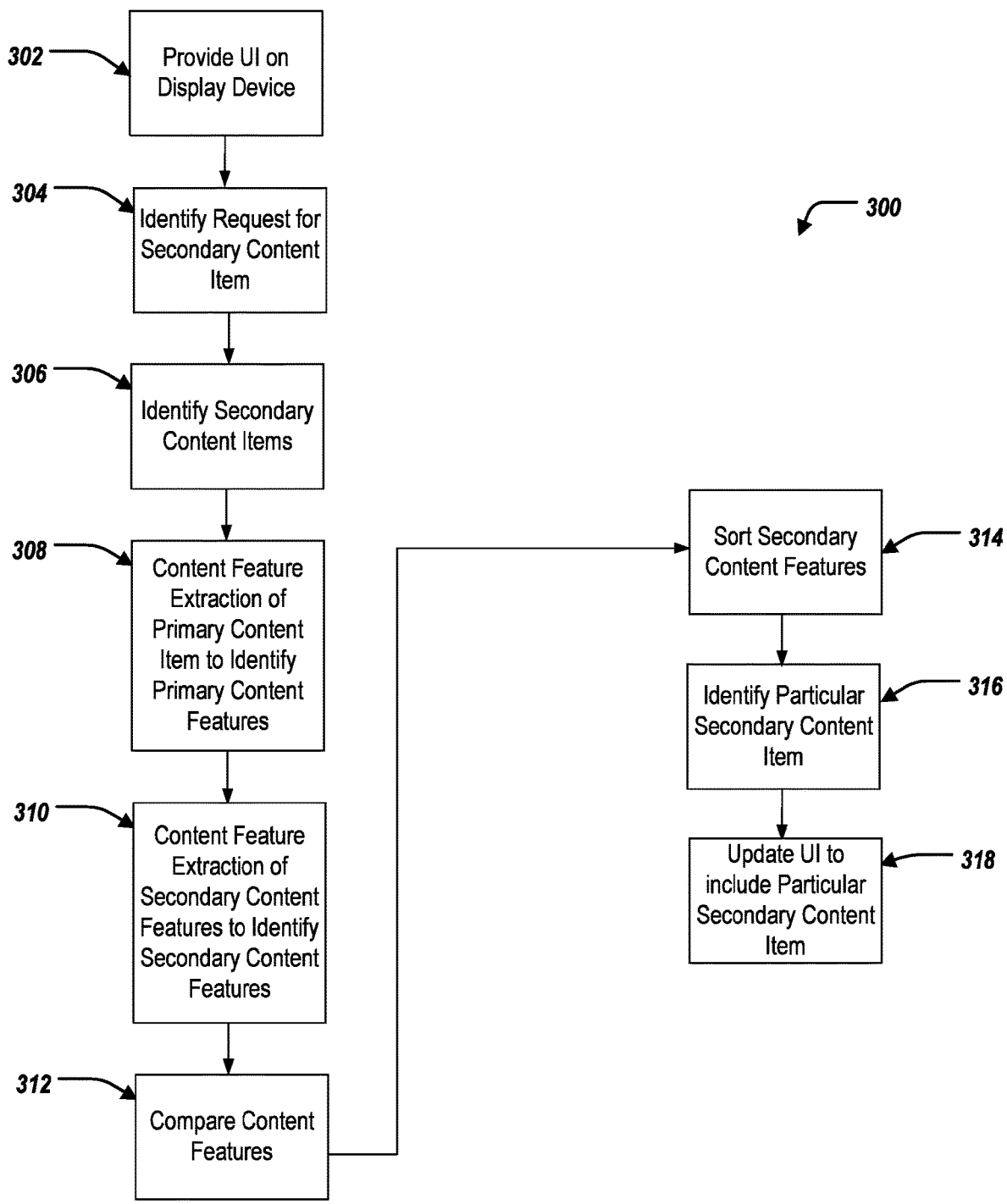
FIGS. 3-7 illustrates respective methods for managing content of a user interface of an information handling system.

FIG. 3 illustrates a flowchart depicting selected elements of an embodiment of a method 300 for managing content of a user interface of an information handling system. The method 300 may be performed by the information handling system 100, the environment 200, the information handling system 202, the content management computing module 210, and/or the UI application 212, and with reference to FIGS. 1-2. It is noted that certain operations described in method 300 may be optional or may be rearranged in different embodiments.

The UI application 212 can provide for display a user interface (UI) 213 on the display device 220 (302). The UI application 212 can provide a primary content item 230 for inclusion by the UI 213. In some examples, the primary content item 230 can refer to content that a user 240 is primarily going to consume, and content that the user 240 is interested in that is provided by the UI application 212. For example, the UI application 212 can include a gaming application, and the primary content item 230 can include the game, or gaming details of the game, or content related to the game. For example, the UI 213 can include a web page, and the primary content item 230 can include content provided by the UI application 212 that the user 240 is directly interacting with—e.g., a news website. The UI 213 can include a layout of content items, including a layout position of the content items. The layout position can refer to a position and/or size of the content item within the UI 213.

The content management computing module 210 can identify a request for a secondary content item to be included within the UI 213 (304). Specifically, the content management computing module 210 can receive the request for the secondary content item from the UI application 212. The UI application 212, when providing the UI 213 to the display device 220, can identify one or more layout positions of the UI 213 for inclusion of secondary content items that is provided by a third-party source (e.g., the third party content provider 204).

In response to the request, the content management computing module 210 can identify one or more secondary content items 250 provided by the third party content provider 204 (306). In some examples, in response to the request, the content management computing module 210 can identify two or more secondary content items 250 provided by the third party content provider 204. Specifically, the storage device 208 can store secondary content items 250. The content management computing module 210, in response to the request, can communicate with the third party content provider 204 to identify secondary content items 250 that are stored by the storage device 208. The secondary content items 250 are independent of the primary content item 230. For example, the secondary content items 250 can include advertisements, news content, recommended image/video content (streams), and similar. For example, the third party content provider 204 can include an advertisement-based content provider 204, and the secondary content items 250 can include advertisements.

Figure 4:
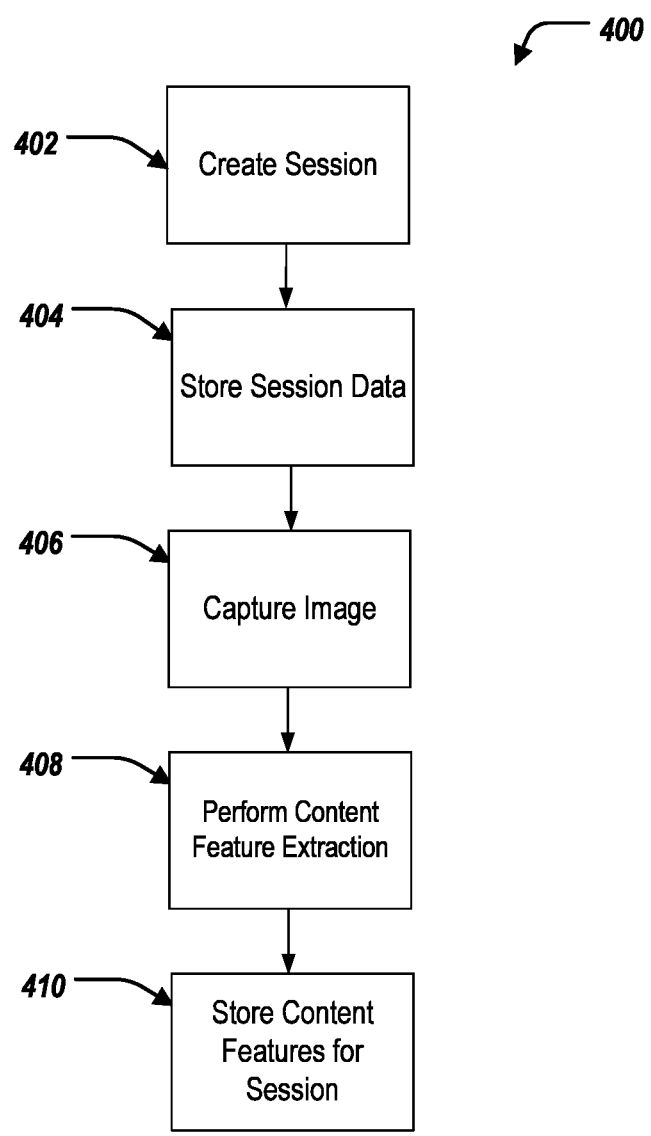

In response to the request, the content management computing module 210 can perform content feature extraction of the primary content item 230 to identify primary content features (308). Furthermore, in response to the request, the content management computing module 210 can perform content feature extraction of the secondary content items 250 to identify secondary content features (310). Specifically, FIG. 4 illustrates a flowchart depicting selected elements of an embodiment of a method 400 for performing content feature extraction of content items. The method 400 may be performed by the information handling system 100, the environment 200, the information handling system 202, the content management computing module 210, and/or the UI application 212, and with reference to FIGS. 1-2. It is noted that certain operations described in method 400 may be optional or may be rearranged in different embodiments.

The content management computing module 210 create a session for the content item (402). The content item can include the primary content item 230 or any of the secondary content items 250. The content management computing module 210 can store the session data in the storage device 260 (404). The content management computing module 210 can periodically capture an image from the content item (406). For example, when the content item includes a video (multiple images), the content management computing module 210 captures an image (frame) from the video. The content management computing module 210 performs content feature extraction on the image (frame) of the content item (408). For example, the content management computing module 210 can perform scale-invariant feature transformation of the content item (the primary content item 230 and/or any of the secondary content items 250). The content management computing module 210 can store the content features for the image (frame) for the session in the storage device 260 (410). The content management computing module 210 can repeat 406-410 for each image (frame) of the content item (video) for the current session.

In some examples, the content management computing module 210 can perform content feature extraction on the secondary content items 250 for every layout position of the UI 213. For example, due to the different requirements for each layout position (i.e., size, aspect ratio, background material, etc.), the content management computing module 210 can perform content feature extraction on the secondary content items 250 for every layout position of the UI 213 (e.g., each size, aspect ratio, background material).

Returning to FIG. 3, the content management computing module 210 can compare the primary content features (of the primary content item 230) and the secondary content features (of the secondary content items 250) to identify similarities between the secondary content features and the primary content features (312). The similarity between the secondary content features and the primary content features can define the similarity between the primary content item 230 and the secondary content items 250. In some examples, the similarity between the secondary content features and the primary content features is a similarity in style, theme, or both, between the secondary content features and the primary content features. For example, when the content management computing module 210 employs scale-invariant feature transformation of the primary content item 230 and the secondary content items 250, the content management computing module 210 can partition the content item (e.g., one of the primary content item 230 and the secondary content items 250) into feature vectors, with each feature vector providing a mathematical representation of the feature. The content management computing module 210 can compare the feature vectors of each of the primary content item 230 and the secondary content items 250 using a comparison technique (e.g., average of each vector, per element comparison, etc.) to determine a similarity between the primary content item 230 and the secondary content items 250.

The content management computing module 210 can sort the secondary content features (of the secondary content items 250) based on the similarity between the secondary content features and the primary content features (314). That is, the content management computing module 210 sorts the secondary content features based on the similarity to the primary content features. Specifically, the content management computing module 210 can rank the secondary content features based on the similarity between each secondary content feature and the primary content features. That is, the content management computing module ranks the secondary content features according to a similarity (e.g., a similarity score using feature vector comparison, as described herein) such that the secondary content features having a greater similarity (e.g., greater similarity score using feature vector comparison as described herein) are ranked higher (e.g., in a ranked list). For example, secondary content features that are similar in style and/or theme to the primary content features are ranked higher (e.g., in a ranked list). For example, the primary content items 230 includes content related to a "dark and gloomy" game, with the primary content features representative of such (e.g., feature vectors representative of such). The content management computing module 210 can rank the secondary content features that are most similar to the theme and style of "dark and gloomy (e.g., similar based on the vectors representative of the secondary content features).

The content management computing module 210 can identify, based on the similarity between the secondary content features and the primary content features, a particular secondary content item 270 of the secondary content items 250 (316). In other words, the content management computing module 210 can identify the particular secondary content item 270 that most closely matches the primary content item 230. Specifically, the content management computing module 210, identifies the particular secondary content item 270 by identifying a highest ranked secondary content feature and identifies the particular secondary content item 270 that corresponds to the highest ranked secondary content feature. That is, the content management computing module 210 identifies the secondary content feature that is the highest ranked secondary content feature of the secondary content features (i.e., the secondary content feature that is most similar to the primary content features—for example, using feature vector comparison). The content management computing module 210 then identifies the secondary content item 270 that corresponds to the highest ranked secondary content feature.

The content management computing module 210 can update the UI 213 to include the particular secondary content item 270 within the UI 213 (318). That is, the content management computing module 210 can render, or provide for rendering, the particular secondary content item 270 within the UI 213. In some examples, the particular secondary content item 270 can be provided within the UI 213 for one or more (or every) layout position of the UI 213 (e.g., size, aspect ratio, background material, etc.).

Figure 5:
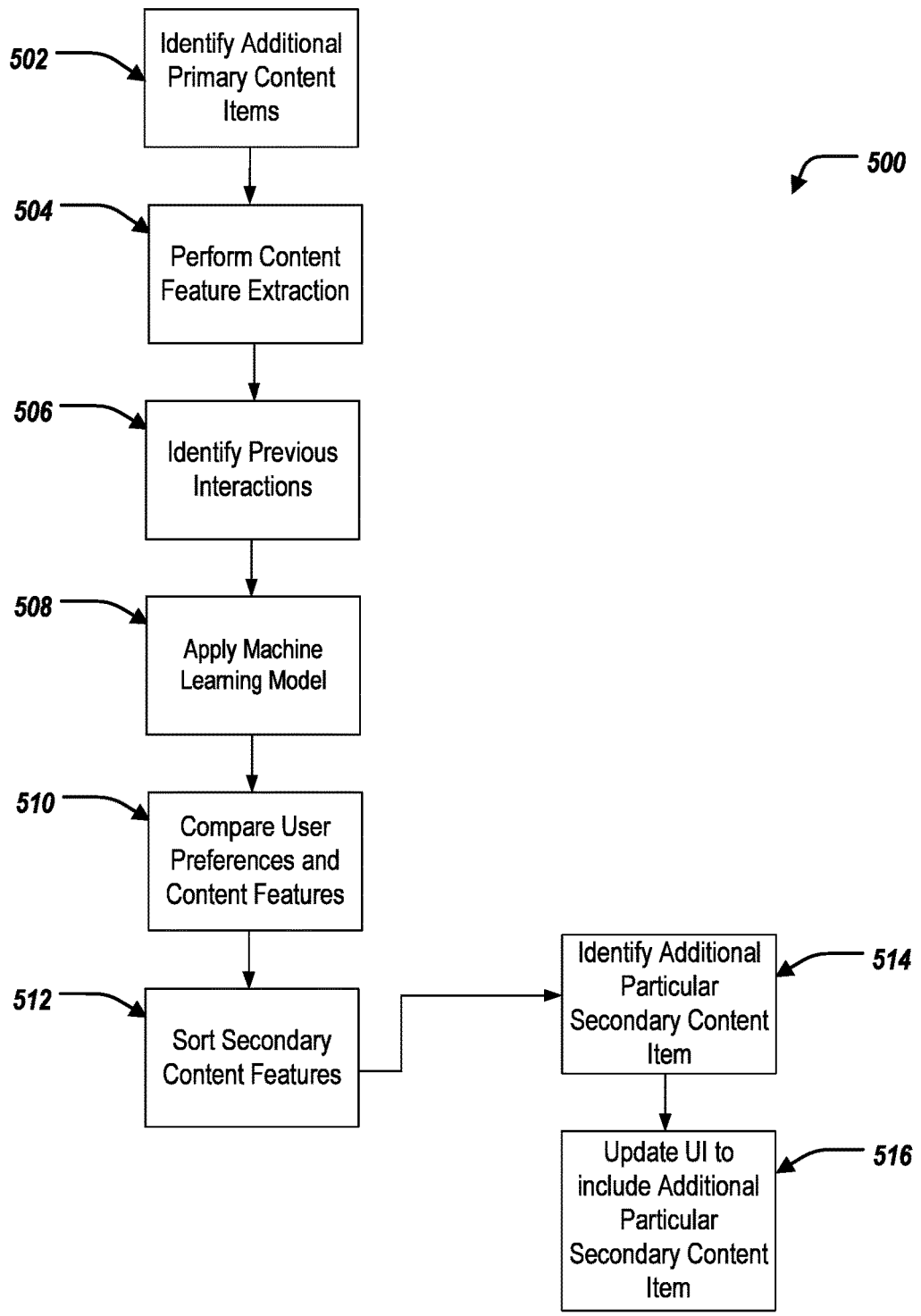

FIG. 5 illustrates a flowchart depicting selected elements of an embodiment of a method 500 for managing content of a user interface of an information handling system using machine learning (ML). The method 500 may be performed by the information handling system 100, the environment 200, the information handling system 202, the content management computing module 210, and/or the UI application 212, and with reference to FIGS. 1-2. It is noted that certain operations described in method 500 may be optional or may be rearranged in different embodiments.

In short, the content management computing module 210 can "learn" behaviors of the user 240 over time as the user 240 interacts with the UI 213 provided by the UI application 212 to determine the "style" that the user 240 prefers. As the user 240 interacts with the UI 213, the content management computing module 210 can update a machine learning (ML) model 275 (e.g., stored by memory subsystem 130). The ML model 275 can predict content item features that the user 240 would prefer to see as secondary (recommended) content items within the UI 213.

Specifically, the content management computing module 210 can identify additional primary content items that have been previously provided for display on the UI 213 of the display device 220 by the UI application 212 (502). That is, the UI application 212 can provide the additional primary content items within the UI 213 at a time prior to providing the primary content item 230. The content management computing module 210 can store data related to presentation of the additional primary content items within the storage device 260.

The content management computing module 210 can perform content feature extraction of the additional primary content items to identify additional primary content features (504). That is, the content management computing module 210 performs content feature extraction of the additional primary content items similar to that mentioned with respect to FIG. 4.

The content management computing module 210 can identify previous interactions of the user 240 with the additional primary content items (506). For example, the interactions by the user 240 with the UI 213 can include visiting a webpage of a specific entity (e.g., video game), launching the UI application 212, interacting with the UI application 212 (e.g., launching a game), interacting with the UI application for a period of time (e.g., playing a game for n hours), unlocking an achievement with the UI application 212 (e.g., unlocking an achievement within a game), interacting with other users of the UI application 212 through the UI application 212 (e.g., playing a game with specific other users on a consistent basis), searching for a topic related to the UI application 212 (e.g., searching for news about a game or genre of the game), watching a stream related to the UI application 212 (e.g., watching a stream for a game). The interactions by the user 240 can further include metadata of a library of similar UI applications 212 (e.g., a game library) associated with the user 240 including details of the similar UI applications 212 including art/screenshots (e.g., art/ screenshots of a game), genre of the similar UI applications (e.g., game genre), description of the similar UI applications (e.g., game description), and/or popularity of the similar UI applications (e.g., game popularity). In some examples, the content management computing module 210 can store data related to the previous interactions of the user 240 with the additional primary content items within the storage device 260.

The content management computing module 210 can apply the machine learning model 275 to identify user preferences of the user 240 based on the previous interactions of the user 240 with the additional primary content items (508). That is, the ML model 275 can apply ML algorithms to the previous interactions of the user 240 with the UI 213 and the UI application 212 to determine user preferences of the user 240 with respect to the secondary content items 250. In some examples, the ML model 275 can include a convolutional neural network (CNN), an artificial neural network (ANN), or any type of ML model. In some examples, the user preferences can include content features.

The content management computing module 210 can compare the user preferences and the secondary content features (of the secondary content items 250) to identify similarities between the secondary content features and the user preferences (510). In some examples, the similarity between the secondary content features and the user preferences is a similarity in style, theme, or both between the secondary content features and the user preferences. For example, when the content management computing module 210 employs scale-invariant feature transformation of the content features of the user preferences and the secondary content items 250, the content management computing module 210 can partition the content item (e.g., one of the user preferences and the secondary content items 250) into feature vectors, with each feature vector providing a mathematical representation of the feature. The content management computing module 210 can compare the feature vectors of each of the user preferences and the secondary content items 250 using a comparison technique (e.g., average of each vector, per element comparison, etc.) to determine a similarity between the user preferences and the secondary content items 250.

The content management computing module 210 can sort the secondary content features (of the secondary content items 250) based on the similarity between the secondary content features and the user preferences (512). That is, the content management computing module 210 sorts the secondary content features based on the similarity to the user preferences. Specifically, the content management computing module 210 can rank the secondary content features based on the similarity between each secondary content feature and the content features of the user preferences. That is, the content management computing module 210 ranks the secondary content features according to a similarity (e.g., a similarity score using feature vector comparison, as described herein) such that the secondary content features having a greater similarity (e.g., greater similarity score using feature vector comparison as described herein) are ranked higher (e.g., in a ranked list). For example, secondary content features that are similar in style and/or theme to the user preferences are ranked higher (e.g., in a ranked list).

The content management computing module 210 can identify, based on the similarity between the secondary content features and the user preferences, an additional particular secondary content item of the secondary content items 250 (514). In other words, the content management computing module 210 can identify the additional particular secondary content item that most closely matches the user preferences. Specifically, the content management computing module 210, identifies the additional particular secondary content item by identifying a highest ranked secondary content feature and identifies the additional particular secondary content item that corresponds to the highest ranked secondary content item. That is, the content management computing module 210 identifies the secondary content feature that is the highest ranked secondary content feature of the secondary content features (i.e., the secondary content feature that is most similar to the user preferences—for example, using feature vector comparison). The content management computing module 210 then identifies the additional secondary content item that corresponds to the highest ranked secondary content feature.

The content management computing module 210 can update the UI 213 to include the additional particular secondary content item within the UI 213 (516). That is, the content management computing module 210 can render, or provide for rendering, the additional particular secondary content item within the UI 213. In some examples, the additional particular secondary content item can be provided within the UI 213 for one or more (or every) layout position of the UI 213 (e.g., size, aspect ratio, background material, etc.).

Figure 6:
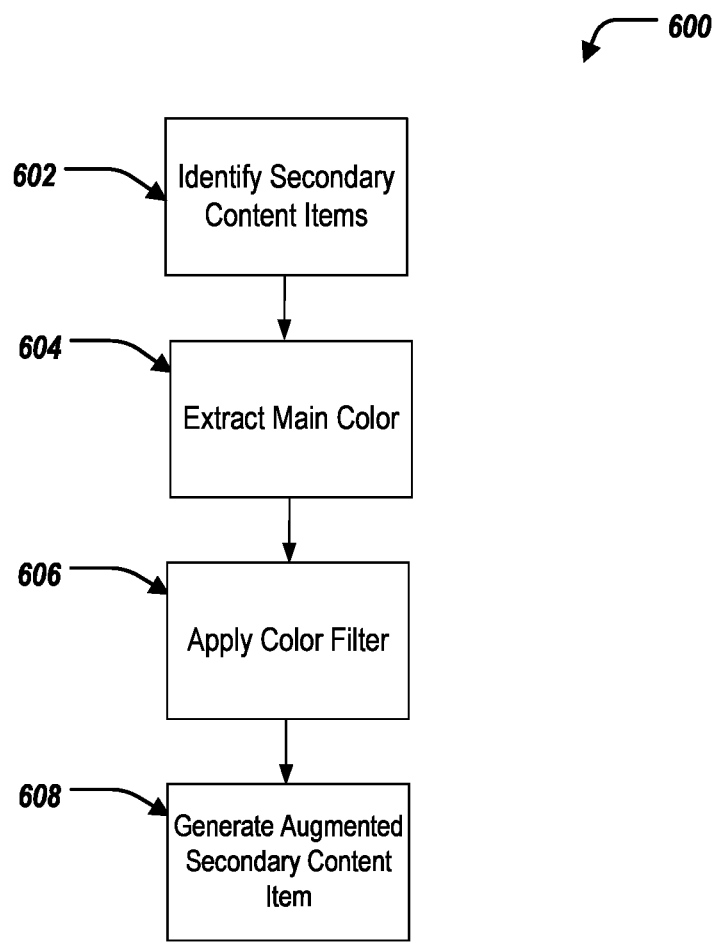

FIG. 6 illustrates a flowchart depicting selected elements of an embodiment of a method 600 for modifying content items. The method 600 may be performed by the information handling system 100, the environment 200, the information handling system 202, the content management computing module 210, and/or the UI application 212, and with reference to FIGS. 1-2. It is noted that certain operations described in method 600 may be optional or may be rearranged in different embodiments.

In short, the content management computing module 210 can shift the style of the secondary content items 250 to match the style of the primary content item 230 prior to rendering the particular secondary content item 270 on the UI 213. For example, the content management computing module 210 can extract main colors of the primary content item 230 and add a color filter to the particular secondary content item 270. After the filter is applied, the particular secondary content item 270 can be rendered on the UI 213. That is, the content management computing module 210 can modify the particular secondary content item 270 based on the primary content features, including adding a color filter to the particular secondary content item 270 based on a main color of the primary content features.

Specifically, the content management computing module 210 can identify the secondary content items 250 (602). That is, the content management computing module 210 can identify the secondary content items 250 similar to the process described with respect to FIG. 3 or 5. The content management computing module 210 can extract a main color of the primary content item 230 (604). The content management computing module 210 can apply the color filter to the secondary content items 250 (606). The content management computing module 210 can generate an augment secondary content item based on application of the color filter (608).

Figure 7:
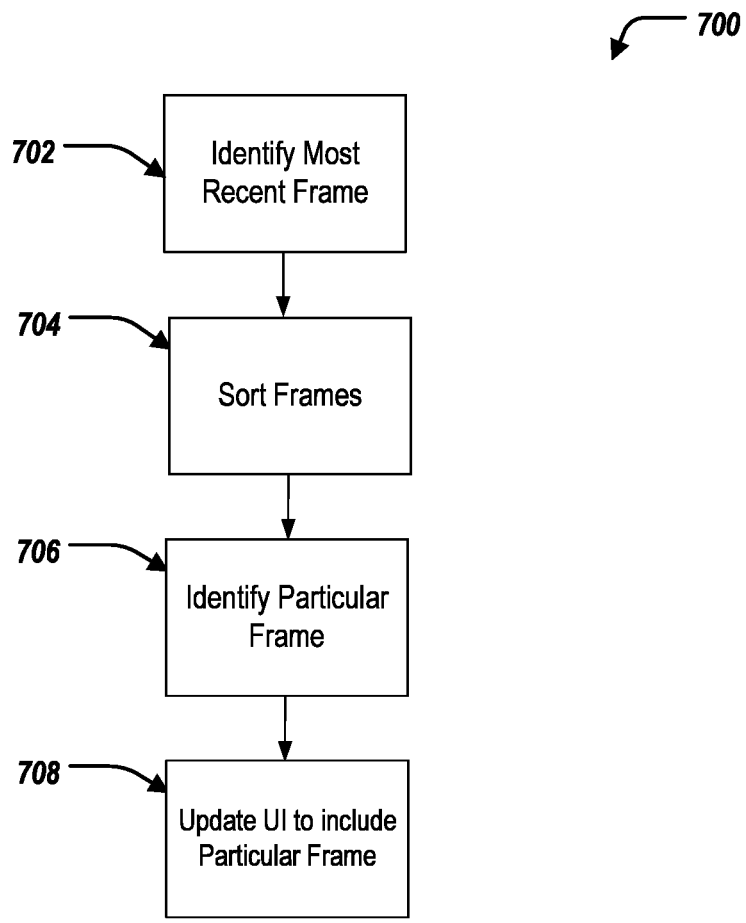

FIG. 7 illustrates a flowchart depicting selected elements of an embodiment of a method 700 for identification of a keyframe. The method 700 may be performed by the information handling system 100, the environment 200, the information handling system 202, the content management computing module 210, and/or the UI application 212, and with reference to FIGS. 1-2. It is noted that certain operations described in method 700 may be optional or may be rearranged in different embodiments.

In short, the content management computing module 210 can identify a keyframe (or thumbnail) of a content item when the content item includes a video. For example, when the primary content item 230 includes a video, the content management computing module 210 determines the secondary content item 250 that is most similar to the most recent frame (still image) of the primary content item 230. In other words, the content management computing module 210 can sort the frames of the particular secondary content item 270 (when the particular secondary content item 270 is a video) based on the similarity between the secondary content features (of the particular secondary content item 270) and the primary content features (of the primary content item 230), similar to that mentioned above with respect to FIG. 3. The content management computing module 210 can identify, based on the sorting, a particular frame of the particular secondary content item 270. The content management computing module 210 can update the UI 213 to include the particular frame of the particular secondary content item 270.

Specifically, the content management computing module 210 can identify a most recent image (or frame) from the primary content item 230 (702). For example, the content management computing module 210 can obtain session data from the storage device 260 indicating the most recent image (or frame) from the primary content item 230. The content management computing module 210 can sort the images (frames) of the particular secondary content item 270 based on the similarity between the secondary content features of each of the images (frames) and the primary content features of the image (or frame) from the primary content item 230 (704). For example, the content management computing module 210 can obtain session data from the storage device 260 indicating the images (frames) of the particular secondary content item 270. That is, the content management computing module 210 sorts the images (frames) of the particular secondary content item 270 based on a similarity of the secondary content features of each image (frame) to the primary content features of the most recent image (frame) of the primary content item 230. Next, the content management computing module 210 can rank the images (frames) of the particular secondary content item 270 based on a similarity of the secondary content features of each image (frame) to the primary content features of the most recent image (frame) of the primary content item 230. That is, the content management computing module ranks the images (frames) of the particular secondary content item 270 based on the respective secondary content features according to a similarity (e.g., a similarity score using feature vector comparison as described herein) such that the secondary content features of the images (frames) of the particular secondary content item having a greater similarity (e.g., greater similarity score using feature vector comparison as described herein) are ranked higher (e.g., in a ranked list The content management computing module 210 can identify a particular image (frame) of the particular secondary content item 270 (706) In other words, the content management computing module 210 can identify a particular image (frame) of the particular secondary content item 270 that most closely matches the most recent image (frame) of the primary content item 230. Specifically, the content management computing module 210, identifies the particular image (frame) of the particular secondary content item 270 by identifying a highest ranked secondary content feature and identifies the particular image frame (frame) of the particular secondary content item 270 that corresponds to the highest ranked secondary content item. That is, the content management computing module 210 identifies the secondary content feature that is the highest ranked secondary content feature of the secondary content features (i.e., the secondary content feature that is most similar to the primary content features—for example, using feature vector comparison). The content management computing module 210 then identifies the particular image (frame) of the particular secondary content item 270 that corresponds to the highest ranked secondary content feature.

The content management computing module 210 can update the UI 213 to include the particular image (frame) of the particular secondary content item 270 within the UI 213 (708). That is, the content management computing module 210 can render, or provide for rendering, the particular image (frame) of the particular secondary content item 270 within the UI 213 as the keyframe.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing content of a user interface, the method comprising:
    identifying a user interface (UI) application that provides for display a UI on a display device, the UI application providing a primary content item for inclusion by the UI;

identifying a request for a secondary content item to be included within the UI;

in response to the request:
identifying one or more secondary content items;
performing content feature extraction of the primary content item to identify primary content features;
performing content feature extraction of the secondary content items to identify secondary content features;
comparing the primary content features and the secondary content features to identify similarities between the secondary content features and the primary content features;
sorting the secondary content features based on the similarity between the secondary content features and the primary content features;
identifying, based on the sorting, a particular secondary content item of the one or more secondary content items; and
updating the UI to include the particular secondary content item within the UI.

2. The computer-implemented method of claim 1, further comprising identifying, based on the sorting, the particular secondary content item of two or more secondary content items.

3. The computer-implemented method of claim 2, wherein sorting further includes ranking the secondary content features based on the similarity between each secondary content feature and the primary content features, and wherein identifying the particular secondary content item further includes identifying a highest ranked secondary content feature and identifying the particular secondary content item that corresponds to the highest ranked secondary content item.

4. The computer-implemented method of claim 2, further comprising:
identifying additional primary content items previously provided for display on the UI of the display device by the UI application;
performing content feature extraction of the additional primary content items to identify additional primary content features;
identifying previous interactions of a user with the additional primary content items; and
applying a machine learning model to identify user preferences of the user based on the previous interactions of the user with the additional primary content items.

5. The computer-implemented method of claim 4, further comprising:
comparing the user preferences and the secondary content features to identify similarities between the secondary content features and the user preferences;
sorting the secondary content features based on the similarity between the secondary content features and the user preferences;
identifying, based on the sorting, an additional particular secondary content item of the two or more secondary content items; and
updating the UI to include the additional particular secondary content item within the UI.

6. The computer-implemented method of claim 2, further comprising:
modifying the particular secondary content item based on the primary content features.

7. The computer-implemented method of claim 6, wherein modifying the particular content item includes adding a color filter to the particular content item based on a main color of the primary content features.

8. The computer-implemented method of claim 2, wherein the particular secondary content item is a video content item, the method further comprising:
sorting frames of the video content item based on a similarity between the secondary content features and the primary content features;
identifying, based on the sorting, a particular frame of the particular secondary content item; and
updating the UI to include the particular frame of the particular secondary content item within the UI.

9. The computer-implemented method of claim 2, wherein performing content feature extraction of the primary content item to identify primary content features further includes performing scale-invariant feature transform of the primary content item to identify primary content features, and wherein performing content feature extraction of the secondary content item to secondary primary content features further includes performing scale-invariant feature transform of the secondary content item to identify secondary content features.

10. An information handling system comprising a processor having access to memory media storing instructions executable by the processor to perform operations comprising:
identifying a user interface (UI) application that provides for display a UI on a display device, the UI application providing a primary content item for inclusion by the UI;
identifying a request for a secondary content item to be included within the UI;
in response to the request:
identifying one or more secondary content items;
performing content feature extraction of the primary content item to identify primary content features;
performing content feature extraction of the secondary content items to identify secondary content features;
comparing the primary content features and the secondary content features to identify similarities between the secondary content features and the primary content features;
sorting the secondary content features based on the similarity between the secondary content features and the primary content features;
identifying, based on the sorting, a particular secondary content item of the one or more secondary content items; and
updating the UI to include the particular secondary content item within the UI.

11. The information handling system of claim 10, the operations further comprising identifying, based on the sorting, the particular secondary content item of two or more secondary content items.

12. The information handling system of claim 11, wherein sorting further includes ranking the secondary content features based on the similarity between each secondary content feature and the primary content features, and wherein identifying the particular secondary content item further includes identifying a highest ranked secondary content feature and identifying the particular secondary content item that corresponds to the highest ranked secondary content item.

13. The information handling system of claim 11, the operations further comprising:
identifying additional primary content items previously provided for display on the UI of the display device by the UI application;

performing content feature extraction of the additional primary content items to identify additional primary content features;

identifying previous interactions of a user with the additional primary content items; and applying a machine learning model to identify user preferences of the user based on the previous interactions of the user with the additional primary content items.

14. The information handling system of claim 13, the operations further comprising:

comparing the user preferences and the secondary content features to identify similarities between the secondary content features and the user preferences;

sorting the secondary content features based on the similarity between the secondary content features and the user preferences;

identifying, based on the sorting, an additional particular secondary content item of the two or more secondary content items; and updating the UI to include the additional particular secondary content item within the UI.

15. The information handling system of claim 11, the operations further comprising:

modifying the particular secondary content item based on the primary content features.

16. The information handling system of claim 15, wherein modifying the particular content item includes adding a color filter to the particular content item based on a main color of the primary content features.

17. The information handling system of claim 11, wherein the particular secondary content item is a video content item, the operations further comprising:

sorting frames of the video content item based on a similarity between the secondary content features and the primary content features;

identifying, based on the sorting, a particular frame of the particular secondary content item; and updating the UI to include the particular frame of the particular secondary content item within the UI.

18. The information handling system of claim 11, wherein performing content feature extraction of the primary content item to identify primary content features further includes performing scale-invariant feature transform of the primary content item to identify primary content features, and wherein performing content feature extraction of the secondary content item to secondary primary content features further includes performing scale-invariant feature transform of the secondary content item to identify secondary content features.

19. A non-transitory computer-readable medium storing software comprising instructions executable by one or more computers which, upon such execution, cause the one or more computers to perform operations comprising:

identifying a user interface (UI) application that provides for display a UI on a display device, the UI application providing a primary content item for inclusion by the UI;

identifying a request for a secondary content item to be included within the UI;

in response to the request:
    identifying one or more secondary content items;
    performing content feature extraction of the primary content item to identify primary content features;
    performing content feature extraction of the secondary content items to identify secondary content features;

comparing the primary content features and the secondary content features to identify similarities between the secondary content features and the primary content features;

sorting the secondary content features based on the similarity between the secondary content features and the primary content features;

identifying, based on the sorting, a particular secondary content item of the one or more secondary content items; and updating the UI to include the particular secondary content item within the UI.

20. The computer-readable medium of claim 19, the operations further comprising identifying, based on the sorting, the particular secondary content item of two or more secondary content items.

* * * * *